Patented Apr. 4, 1950

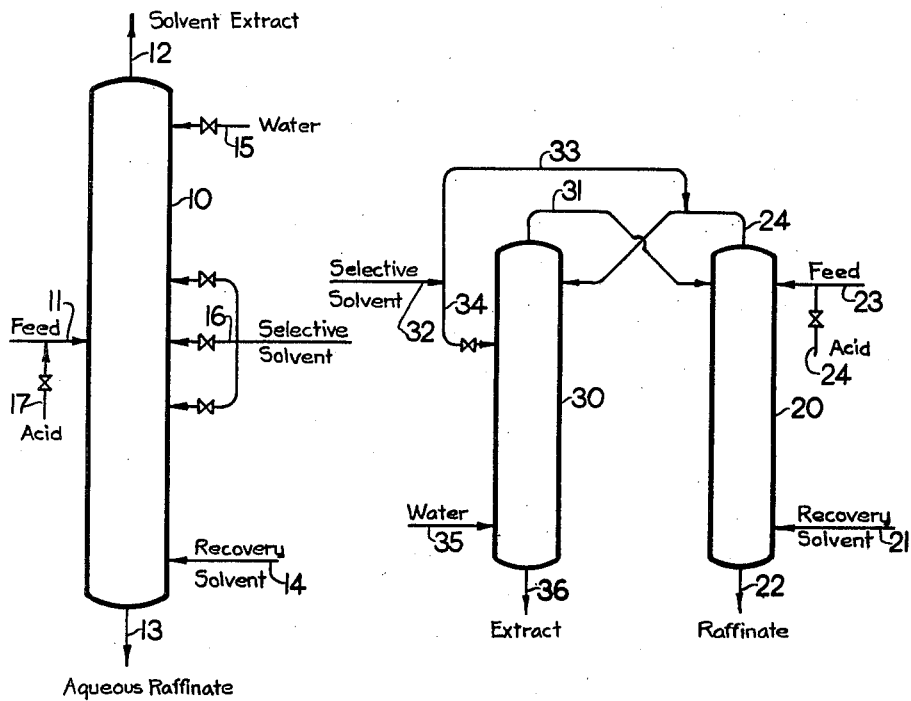
Figure I
Figure II
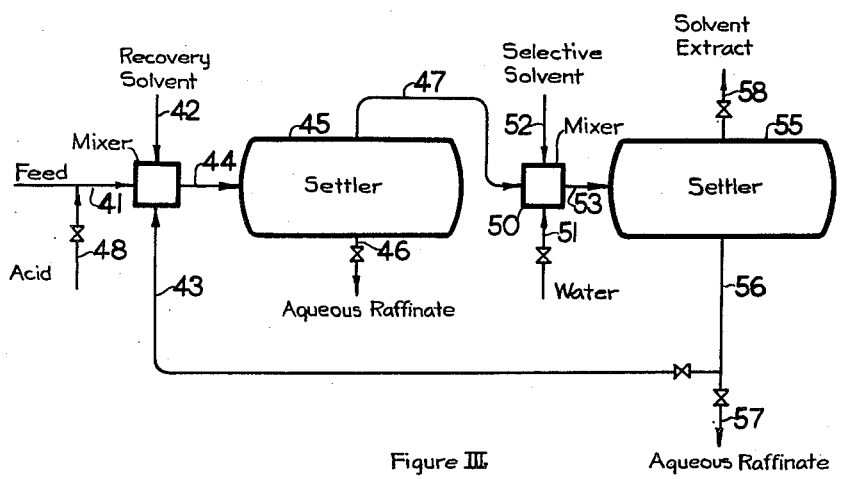
Figure III

2,503,214

UNITED STATES PATENT OFFICE 2,503,214

EXTRACTION OF PENICILLIN

Gino J. Pierotti, Albany, Calif., assignor to Shell Development Company, San Francisco, Calif., a corporation of Delaware Application February 14, 1945, Serial No. 577,824

14 Claims. (Cl. 260—302)

This invention involves a process for the recovery and purification of antibiotics, such as penicillin. More particularly, it relates to a process for the separation of organic impurities, more soluble in acidic water than is penicillin, from a solution containing them and the penicillin. This invention is a continuation-in-part of application, Serial No. 540,922, filed June 19, 1944 now abandoned, and particularly relates to an improvement in Step VI therein for the removal of acids stronger than penicillin.

Anitbiotic substances such as penicillin are the products of certain fungus growths. There are a number of antibiotics known, but only penicillin is being commercially raised today, although it is quite likely that others may be produced in the near future. For a discussion of sources of antibiotics, and particularly of penicillin, refer to "Endeavor" (Kynock Press, London for I. C. I.) vol. 3, No. 9, January 1944, pp. 3 to 14.

Penicillin is an organic acid, a basteriostatic agent and an important drug for combating diseases and for preventing the spread of infections. It is produced during the growth of certain molds, such as penicillium notatum, in an aqueous solution. There are several different ways of growing these molds, for example, in submerged liquid cultures, or on liquid surface cultures, or on moist bran. The aqueous broth obtained from the various cultures usually contains between about .01 and .001% by weight of penicillin or between about 10 and 200 Oxford units per ml. (see the article by Floury and Jennings in the "British Journal of Experimental Pathology," vol. 23, page 120, of June 1942. The broth also contains varying amounts of solids, non-ionic impurities, amphoteric materials, different organic impurities including acids both stronger and weaker than penicillin, etc. There are several different penicillins known, for example: penicillins F and G, allo penicillin, etc., some of which have different solubilities in different solvents.

It is an object of this invention to improve both the purity and the recovery of antibiotics, particularly penicillin. Another purpose is to carry out this purification and recovery in a minimum space of time. Another purpose is to effectively and efficiently remove organic impurities normally associated with penicillin, including acids stronger than penicillin, from aqueous solutions containing them and penicillin. Still another purpose is to achieve this by a continuous liquid-liquid countercurrent solvent extraction process.

Generally speaking, this invention comprises separating penicillin from water-soluble impurities normally associated therewith in an acidic aqueous solution of penicillin by countercurrently extracting said solution with a liquid solvent phase which has the property of decreasing in solvent power for penicillin and increasing in selectivity for penicillin in the direction of the flow of the solvent; or conversely, extracting said aqueous solution with a liquid solvent under conditions wherein the solvent phase possesses an increasing solvent power and a diminishing selectivity for penicillin in the direction of flow of said aqueous phase. For example, an aqueous solution of penicillin first is contacted with a recovery solvent (as defined later) to extract substantially all the penicillin, as well as some normally associated impurities, from the aqueous phase, and thereafter a solvent more selective for penicillin miscible with the recovery solvent is added to form a mixed solvent phase and to spring at least some of these impurities from the mixed solvent phase. The resulting solvent phase is washed with an aqueous solution to insure the removal of the sprung impurities. The resulting two phases, one a solvent phase containing penicillin and the other an acidic aqueous phase containing the impurities, are separately removed at opposite ends of the extraction zone.

It is usually desirable to remove the penicillin from the solvent phase and re-use the solvents therein. This may be accomplished by any suitable means, such as by neutralization of the penicillin acid with a basic material such as calcium, strontium or barium hydroxide, sodium or potassium bicarbonate, phosphate, stearate, tartrate, etc. The penicillin removed from the solvent phase may be further purified and concentrated before it is ready for storage or for use.

Before treating the raw penicillin solution or broth by the process of this invention the solids therein should be removed. It is preferred, but not essential, that some of the soluble and liquid impurities be removed also, and/or the penicillin be concentrated from the raw broth prior to treating the penicillin solution by the process of this invention. These pre-treating steps may be accomplished in different ways, for example: by adsorption of the penicillin on charcoal and elution of the absorbate in an aqueous solvent (see Chemical and Metallurgical Engineering April 1944, pages 94–98 and 130–133), or by a liquid extraction process such as that shown in Pierotti et al co-pending application, Serial No. 540,922, filed June 19, 1944. It is desirable that the penicillin in the solution fed to the extraction process of this invention have a concentration above about .001% by weight.

Penicillin acid decomposes very easily at temperatures slightly above 0° C. Strong acids, strong bases, many heavy metals and certain other re-agents destroy it. Accordingly, this process is carried out as rapidly as possible and as closely to 0° C. as possible without freezing the solutions involved therein. All acids or bases introduced to adjust the hydrogen ion concentration in the aqueous phase in the process are added in dilute aqueous solutions.

No one solvent is known which has both high solvent power and high selectivity for penicillin. Therefore, both a high yield and a high purity cannot be obtained in an extraction of reasonable efficiency with only one solvent. This invention employs the use of at least two organic solvents, one of which has high solvent power for penicillin (hereinafter called the "recovery solvent") and another of which has high selectivity for penicillin (hereinafter called the "selective solvent"). The recovery solvent has a higher distribution ratio K for penicillin than does the selective solvent, whereas the selective solvent has a higher "alpha" value for penicillin with respect to the impurities normally associated therewith than that of the recovery solvent.

$$K = \frac{\text{concentration of penicillin in recovery solvent}}{\text{concentration of penicillin in the aqueous stage}}$$

$$\alpha = \frac{K \text{ of penicillin in recovery solvent}}{K \text{ of the impurities in the recovery solvent}}$$

Both K and α must be greater than one, and the greater the differences between the two alpha values as well as between the two K values of the chosen solvents the better the recovery and the purer the extracted penicillin.

The recovery and selective solvents in admixture with water must form two separate phases. It is desirable that they should be less than 5% and preferably less than 1% by volume soluble in water. They should be miscible with each other and may have different polarities. They must not react with the penicillin or cause it to decompose and must be liquid and not too viscous at temperatures as low as −5° C. They should have a melting point below −5° C. Their solvent characteristics must not be materially affected by the compounds in the penicillin solution including the penicillin itself. Their densities must differ from that of water and may vary from each other, that is, one may be more dense than water and the other may be less dense than water. In order to readily form a separate liquid phase with water it is desirable that the density of the solvent differ from that of water by at least about 10%. Each solvent may be a mixture of individual solvents.

Some suitable organic recovery solvents are formates, acetates, propionates, butyrates, etc., containing from 4 to 8 carbon atoms such as: n- and iso-propyl acetate, n- and iso-butyl acetate, amyl acetates, ethyl and propyl chloro acetates; lactates containing from 5 to 10 carbon atoms; dimethyl phthalate; chloroform; ethylene dichloride; diethylene ether; di-isopropyl ether; methyl propyl ketone, methyl iso-butyl ketone, isophorone; etc.; or mixtures of one or more of the above. In order to have the proper degree of polarity, the recovery solvents should be at least .1% and preferably at least .2% by volume soluble in water.

Some suitable organic selective solvents are light hydrocarbons such as: iso- and n-butanes, iso- and n-pentanes, iso- and n-hexanes, heptanes, benzene, toluene, etc.; and chlorinated hydrocarbons such as: chloroform, carbon tetrachloride, ethylene dichloride, etc. Solvents of low tendency to form hydrogen bonds are more selective for penicillin than those which have a high tendency to form hydrogen bonds and produce associated liquids. Thus, generally speaking, the relatively light hydrocarbons and halogenated derivatives thereof, being more or less non-polar organic solvents are better selective solvents than recovery solvents, although some halogenated hydrocarbons may be used as recovery solvents in combination with still less polar solvents.

Suitable recovery and selective solvent combinations are: chloroform and iso-pentane, methyl iso-butyl ketone and iso-pentane, methyl iso-butyl ketone and chloroform, etc. The choice of a combination depends upon the selective and recovery characteristics of each solvent relative to the different forms of penicillin which may have to be extracted. One solvent may be the recovery solvent for one form of penicillin while the same solvent may be the selective solvent for another form of penicillin.

An aqueous phase is necessary throughout the extraction zone. To maintain, the solvent extract may be washed with water by adding water near the solvent outlet of said zone. Moreover, water may be added at one or more other points throughout the extraction zone. This water may be pure or distilled water, or it may contain a small amount of an electrolyte such as an acid or a buffer substance which may have several levels of ionization, in order to maintain the pH of the aqueous phase throughout the extraction zone between about 1.5 and 5 and preferably between about 2 and 3. Suitable acids are dilute sulfuric, phosphoric, etc., acids. If desired, the electrolyte may be added to the extraction zone with the feed containing the penicillin. The function and control of such aqueous solutions containing ions is fully described in Pierotti et al. co-pending application, Serial No. 540,923, filed June 19, 1944 now abandoned.

The drawing discloses schematic diagrams of three possible flows which may be used in carrying out the process of this invention (for the recovery and purification of a solution of penicillin). Figure I shows a single continuous extraction column which may be used when both solvents are less dense than the aqueous phase. Figure II represents a flow diagram comprising two continuous liquid-liquid extraction columns which may be used when the recovery solvent is less dense and the selective solvent is more dense than the aqueous phase. Figure III is a flow diagram of a continuous or batch liquid-liquid extraction apparatus comprising a series of mixers and settlers.

Referring to Figure I, the countercurrent extraction zone comprising a single column 10 is provided with a feed inlet line 11 for the penicillin solution intermediate the ends of the column, a solvent extract outlet 12 at the top of the column and an aqueous raffinate outlet 13 at the bottom of the column. The penicillin solution is usually an aqueous solution, although it may be a solution in a different solvent if a suitable aqueous phase is maintained throughout the extraction zone. The recovery solvent is introduced into the column 10 through line 14 near the aqueous raffinate outlet in order to insure the maximum recovery of penicillin from the aqueous phase even to the extraction of some of its closely related impurities, if necessary, before the aqueous phase is withdrawn and discarded through line 13. Water, or a suitable aqueous solution containing a buffer and preferably having a pH of about 7, is introduced through the valved line 15 near the solvent phase outlet in order to maintain an aqueous phase throughout the column 10 and secure the highest selectivity for penicillin at the solvent outlet. The selective solvent is introduced into the column through line or lines 16 at one or several points before or after the feed contacts the recovery solvent, or with the feed. Dilute acid, as well as buffer and/or dilute base, may be introduced into the feed line 11 through line 17 or at any other point or points (not shown) along the column to maintain the pH of the aqueous phase within the column below about 5. It is desirable to maintain an increasing pH gradient in the aqueous phase, in that section of the column or extraction zone between the feed and water inlets 11 and 15, respectively, and to maintain more or less of a constant pH in the aqueous phase in that section of the extraction zone between the recovery solvent and feed inlets 14 and 11, respectively.

In column 10, the penicillin is extracted from the aqueous phase into the solvent phase as it passes down the column. The selective solvent tends to spring the impurities (extracted with the penicillin by the recovery solvent) from the solvent phase into the aqueous phase. The water introduced through line 15 washes the impurities and may also wash some of the penicillin from the solvent phase, which penicillin is later re-extracted from the aqueous phase as it passes down the column. This produces a reflux of penicillin in the upper part of the column.

Figure II discloses a modification of the process shown in Figure I, wherein the selective solvent, such as chloroform, is more dense than the aqueous phase, and the recovery solvent, such as methyl iso-butyl ketone, is less dense than the aqueous phase. In order to maintain a continuous process the liquid-liquid extraction zone must be divided into two columns 20 and 30; column 20 for the recovery solvent and aqueous phase feed, and column 30 for both solvents and water wash aqueous phase. The less dense recovery solvent is introduced near the bottom of column 20 through line 21 near the aqueous raffinate outlet 22 and the penicillin solution is fed into the column 20 near its top through line 23. A recovery solvent phase containing penicillin is withdrawn through line 24 at the top of column 20 for transfer to column 30. The top of column 30 is provided with a top aqueous phase outlet line 31 for transfer of the aqueous phase containing impurities to the top of column 20. The dense selective solvent from line 32 is introduced into the recovery solvent phase from the top of column 20 into the transfer line 24 through line 33, in a quantity at least sufficient to produce a mixed solvent phase denser than the aqueous phase present in column 30. Additional selective solvent may be added to other points along column 30, if desired, such as through valve line 34. Water or an aqueous buffer solution, is introduced near the bottom of column 30 through line 35 near the mixed solvent outlet line 36. Acid, base, and buffer may likewise be added to the feed through line 24 and/or at different points (not shown) along columns 20 and 30 as desired.

Figure III comprises two mixer-settler units, which is the minimum number of units necessary for the process of this invention, involving two different solvents. However, additional mixer-settler units may be used in series to obtain any desired number of extraction stages. In Figure III, the penicillin solution, which may be previously acidified by dilute acid introduced through line 48, is fed through line 41 into mixer 40 wherein it is mixed with the recovery solvent introduced through line 42. The aqueous raffinate from a following settler may also be introduced into mixer 40 through line 43 to insure complete recovery of any penicillin from said raffinate before it is discarded. The resulting mixture of recovery solvent and aqueous phase is passed from mixer 40 through line 44 into settler 45, wherein the aqueous phase is allowed to settle and is withdrawn continuously (or intermittently) through bottom line 46. The solvent phase containing the penicillin is withdrawn from settler 45 through top line 47 and passed into mixer 50, wherein it is mixed with water or an aqueous buffer solution introduced through line 51 and with the selective solvent introduced through line 52. This resulting mixture is passed from mixer 50 through line 53 into settler 55, wherein the aqueous phase is allowed to settle and is intermittently (or continuously) withdrawn through line 56 for discard through line 57, or for return to mixer 40 through line 43. The solvent phase containing the recovered and purified penicillin is withdrawn through top line 58.

If the density of the solvents mentioned in describing the above figures are reversed with respect to water, the columns and settlers should be inverted.

Columns 10, 20 and/or 30 may be of any conventional design with packing, baffle plates, or the like, or may, and preferably, be rotary extraction columns. The drawing does not shown auxiliary pumps, pipes, valves, outlets, inlets, tanks, heating and cooling lines, solvent recovery systems, pH indicators and controllers, acid, base, and buffer injection lines, etc., which may be necessary in carrying out the process, because the proper placement of this equipment will be evident to one skilled in the art.

The amounts of each solvent, recovery and selective, employed depends upon various factors including: their relative $a$ and $K$ values; their relative densities; their relative rates of transfer of impurities; the ratio of the various forms of penicillin in the penicillin solution feed; the properties, purity and yield of the final products; etc. However, generally speaking, the ratio of solvent phase to aqueous phase in the extraction zone varies between about .1:1 and 10:1 by volume, and preferably about 1:1; and the ratio of recovery solvent to selective solvent varies between about .05:1 and 20:1 by volume, and preferably between about .1:1 and 10:1.

The following examples illustrate the effectiveness of the process of this invention.

*Example I*

An aqueous penicillin solution having a purity of about 100 Oxford units per mg. of dissolved solids and containing naturally associated impurities was fed into a liquid-liquid rotary extraction column, similar to column 10 in Figure I, at a rate of 15.9 cc. per minute through line 11 together with 1 cc. per minute of a 3% by weight aqueous phosphoric acid solution through line 17 to produce a feed having a pH of 2.0. 15.0 cc. per minute of methyl iso-butyl ketone was introduced through line 14; 7.5 cc. per minute of water was introduced through line 15; and varying amounts of iso-pentane were introduced through line 16 directly opposite the line 11.

15.0 cc. per minute of solvent extract were withdrawn from the top line 12 and 24.4 cc. per minute of aqueous raffinate were discarded through bottom line 13. The purity of the penicillin removed from each solvent extract by an aqueous solution having a pH of 6.8 are as follows:

| Rate of Iso-pentane fed in cc./minute | Percent Methyl Isobutyl Ketone in Solvent Extract | Percent Recovery of Penicillin | Purity of Penicillin in Oxford Units per mg. |
|---|---|---|---|
| 0 | 100 | 90.5 | 165 |
| 2 | 88 | 90.0 | 209 |
| 4 | 79 | 90.0 | 237 |
| 10 | 60 | 90.0 | 245 |

These results show that the purity of penicillin in the final product is substantially increased by the addition of the selective solvent iso-pentane to the recovery solvent methyl iso-butyl ketone.

*Example II*

An aqueous solution of penicillin having a purity of 100 Oxford units per mg. of dissolved solids and containing dissolved impurities was fed into a rotary extraction column at a rate of 16 cc. per minute together with .9 cc. per minute of 3% solution of phosphoric acid to produce a solution having a pH of 2.0. This aqueous feed was continuously countercurrently contacted with a mixed recovery solvent (50–50% by volume chloroform and methyl iso-butyl ketone) having a density greater than that of water and which solvent was introduced near the top of the column at the rate of 15 cc. per minute. A lean aqueous raffinate was withdrawn from the top of the column at a rate of 24 cc. per minute. The aqueous solvent extract phase withdrawn from the bottom of the column was introduced near the top of a second rotary extraction column. 15 cc. per minute of more chloroform, as a selective solvent, was introduced into the solvent line between the first and second extraction columns and 7.5 cc. per minute of water was introduced near the bottom of the second extraction column. A rich solvent extract was withdrawn from the bottom of the second column at a rate of 30 cc. per minute which was recovered and tested and found to contain 71% of the penicillin in the feed having a purity of 382 Oxford units per mg. of dissolved solids, in comparison with a recovery of 67% and a purity of 283 Oxford units per mg. in the same apparatus with the same feed but without the addition of the extra 15 cc. of chloroform as a selective solvent.

*Example III*

16.2 cc. per minute of an aqueous solution of penicillin having a purity of about 100 Oxford units per mg. of dissolved solids and containing impurities was mixed with 1.5 cc. per minute of 3% phosphoric acid through line 24 to produce a solution having a pH of 2.2. This latter solution was introduced near the top of a rotary liquid-liquid extraction column, similar to column 20 in Figure II, through line 23 and continuously countercurrently extracted with 15 cc. per minute of methyl iso-butyl ketone introduced through line 21. Aqueous raffinate at the rate of 25.2 cc. per minute was withdrawn through line 22 and was tested to contain 1.8% of the penicillin in the feed. The methyl iso-butyl ketone solvent solution was withdrawn through line 24, mixed with 15 cc. per minute of chloroform introduced through line 33 and passed into column 30 where it was contacted with 7.5 cc. per minute of pure water introduced through line 35. Rich solvent extract containing penicillin was withdrawn through line 36 at the rate of 30 cc. per minute and was tested to contain 95.3% of the penicillin in the original feed. The sodium salt of this penicillin having a pH of 6.8 had a purity of 434 Oxford units per mg. The aqueous solution from the top of column 30 was passed back into column 20 through line 31, as shown in Figure II.

*Example IV*

150 cc. of methyl iso-butyl ketone solvent extract containing penicillin and impurities was mixed with 15 cc. of chloroform and a 150 cc. of pure water and allowed to settle (see mixer and settler 50 and 55 in Figure III). The sodium salt of penicillin recovered from the resulting solvent phase showed a recovery of 90% of the original penicillin in the methyl iso-butyl ketone solvent extract solution having a purity of 570 Oxford units per mg. of dissolved solids, while the resulting aqueous phase was tested to contain 10% of the original penicillin having a purity of 84 Oxford units per mg. of dissolved solids.

Another 150 cc. sample of methyl iso-butyl ketone of the same solvent extract of penicillin was washed with only 75 cc. of water and allowed to settle. The sodium salt of penicillin recovered from the resulting solvent phase had a purity of only 360 Oxford units per mg. of dissolved solids.

*Example V*

100 cc. of a 90–10% methyl iso-butyl ketone-chloroform mixed recovery solvent extract containing penicillin and impurities was mixed with 100 cc. more of chloroform and 100 cc. of water and allowed to settle. The sodium salt of penicillin prepared from the resulting aqueous phase was tested to contain 9.4% of the original penicillin having a purity of 110 Oxford units per mg. of dissolved solids. The sodium salt prepared from the resulting solvent phase was tested to contain 90.6% of the original penicillin having a purity of 450 Oxford units per mg. of dissolved solids.

Another 100 cc. sample of the same original methyl iso-butyl ketone-chloroform solution containing penicillin was washed with only 50 cc. of water and allowed to settle. The sodium salt of penicillin prepared from the resulting solvent phase was tested to have only a purity of 347 Oxford units per mg. of dissolved solids.

The invention claimed is:

1. In a process for extracting penicillin from an aqueous solution containing it and impurities naturally associated therewith, the steps comprising contacting said aqueous solution first with a solvent phase comprising essentially a substantially water-insoluble, polar organic recovery solvent and a substantially water-insoluble, substantially non-polar organic selective solvent to form a contacted aqueous solution and solvent phase, separating said phases, and thereafter further contacting said contacted aqueous solution with a solvent comprising essentially the recovery solvent only, said recovery solvent having a higher solvent power for penicillin than water, said selective solvent having a higher selectivity for penicillin than said recovery solvent, and maintaining in said aqueous solution during said contacting a pH between about 1.5 and 5.

2. The process of claim 1, wherein the ratio of recovery solvent to selective solvent in said mixed solvent phase is between about .05:1 and 20:1 by volume.

3. The process of claim 1, wherein said recovery solvent and said selective solvent are less than 5% v. soluble in water and said recovery solvent is more than .1% v. soluble in water.

4. The process of claim 1, wherein said recovery solvent comprises essentially methyl iso-butyl ketone.

5. The process of claim 1, wherein said selective solvent comprises essentially chloroform.

6. The process of claim 1, wherein said selective solvent comprises essentially iso-pentane.

7. A process for extracting penicillin from an aqueous solution containing it and impurities naturally associated with penicillin, comprising treating said aqueous penicillin solution with an organic, substantially water-insoluble, polar recovery solvent to produce an extract phase containing penicillin and at least some of said impurities and aqueous raffinate phase, separating said extract and raffinate phases, treating said extract phase with an organic, substantially water-insoluble, substantially non-polar selective solvent and water to produce a mixed solvent phase containing penicillin and an aqueous phase containing said impurities and separating said phases, said recovery solvent having a higher solvent power for penicillin than water, said selective solvent having a higher selectivity for penicillin than said recovery solvent, and maintaining in said aqueous phase a pH between about 1.5 and 5.

8. A process for extracting penicillin from an aqueous solution containing it and impurities naturally associated with penicillin, comprising treating said aqueous penicillin solution with an organic, substantially water insoluble, polar recovery solvent to produce an extract phase containing penicillin and at least some of said impurities and aqueous raffinate phase, separating said extract and raffinate phases, treating said extract phase with an organic substantially water-insoluble, substantially non-polar selective solvent and water to produce a mixed solvent phase containing penicillin and an aqueous phase containing said impurities, separating said phases, said recovery solvent having a higher solvent power for penicillin than water, said selective solvent having a higher selectivity for penicillin than said recovery solvent, and recycling said aqueous phase to join with said aqueous penicillin solution in the first treating step, and maintaining in said aqueous phase a pH between about 1.5 and 5.

9. In a process for extracting penicillin from an aqueous solution containing it and impurities naturally associated with penicillin with organic solvents whereby liquid and solvent and aqueous phases are produced, the improvement comprising: maintaining in said aqueous phase a pH between about 1.5 and 5, introducing said aqueous solution into a liquid extraction zone intermediate the outlets of said aqueous and solvent phases, introducing an organic, substantially water-insoluble, polar recovery solvent into said zone intermediate the inlet of said aqueous solution and said aqueous phase outlet, introducing water into said zone intermediate the inlet of said aqueous solution and said solvent phase outlet, and introducing an organic, substantially water-insoluble, substantially non-polar selective solvent intermediate the inlets of said water and said recovery solvent, said recovery solvent having a higher solvent power for penicillin than water and said selective solvent having a higher selectivity for penicillin than said recovery solvent.

10. The process of claim 9, wherein said selective and recovery solvents are miscible in each other throughout said extraction zone.

11. The process of claim 9, wherein said recovery solvent comprises essentially chloroform and said selective solvent is a light hydrocarbon.

12. In a process for the recovery and purification of penicillin from an aqueous solution containing penicillin and other impurities more water-soluble than penicillin, naturally associated therewith, the steps comprising: contacting said aqueous solution with an organic, substantially water-insoluble, polar recovery solvent having a higher solvent power for penicillin than water, to produce an aqueous phase and a solvent phase, adding to said solvent phase an organic, substantially water-insoluble, substantially non-polar selective solvent miscible with said solvent phase and having a higher selectivity for penicillin than said recovery solvent; and contacting the resulting solvent mixture with water to produce an extract phase containing said solvents and penicillin, and a raffinate phase containing said water and some of said impurities.

13. In a process for the recovery and purification of penicillin from an aqueous solution containing penicillin and other impurities more water-soluble than penicillin, naturally associated therewith, the steps comprising: contacting said aqueous solution with an organic, substantially water-insoluble, polar recovery solvent having a higher solvent power for penicillin than water, to produce an aqueous phase and a solvent phase; adding to said solvent phase an organic, substantially water-insoluble, substantially non-polar selective solvent miscible with said solvent phase and having a higher selectivity for penicillin than said recovery solvent; and contacting the resulting solvent mixture with water to produce an extract phase containing said solvents and penicillin, and a raffinate phase containing said water and some of said impurities and recycling said raffinate phase to the first contact step for contact with said recovery solvent and maintaining in said aqueous phase a pH between about 1.5 and 5.

14. In a process for the recovery and purification of penicillin from an aqueous solution having a pH between 1.5 and 5 and containing other impurities more water-soluble than penicillin naturally associated with penicillin, including acids stronger than penicillin, the steps comprising: contacting said solution with an organic, substantially water-insoluble, polar recovery solvent having a higher solvent power for penicillin and some of said stronger acids than water, to form two liquid phases and to remove substantially all of said penicillin together with part of said impurities from the aqueous to the solvent phase; adding to said solvent phase an organic, substantially water-insoluble, substantially non-polar selective solvent miscible with said recovery solvent and having a higher selectivity for penicillin than said recovery solvent, to retain said penicillin in the resulting mixed solvent phase; contacting said resulting mixed solvent phase with water to wash out substantially all the impurities present therein, to produce a mixed solvent extract phase containing substantially pure penicillin, and a raffinate phase containing said impurities; and recycling said raffinate phase to the first contact step for contact with said recovery solvent.

GINO J. PIEROTTI.

(References on following page)

REFERENCES CITED

The following references are of record in the file of this patent:

UNITED STATES PATENTS

| Number | Name | Date |
|---|---|---|
| 2,031,205 | Bray | Feb. 18, 1936 |

OTHER REFERENCES

Winthrop Reports W. I.
Lanset II, August 16, 1941, pages 177–189.
Summary Report on Penicillin, March 29, 1944, pp. 1–4.
Penn. State Reports, November 18, 1944 (1931) (44–109), pp. 1–16.